United States Patent
Gutridge

[15] 3,678,864
[45] July 25, 1972

[54] ARTICULATED MOTORIZED TRUCK TRAIN

[72] Inventor: Jack E. Gutridge, Dyer, Ind.
[73] Assignee: Pullman Incorporated, Chicago, Ill.
[22] Filed: Dec. 16, 1970
[21] Appl. No.: 98,811

Related U.S. Application Data

[63] Continuation-in-part of Ser. No. 712,167, March 11, 1968, abandoned.

[52] U.S. Cl. ............... 105/4 R, 105/1 R, 105/26 R, 105/35, 105/247, 105/342, 180/89
[51] Int. Cl. .................. B61c 3/00, B61f 3/06, B61f 19/04
[58] Field of Search ............... 105/1 R, 3, 4 R, 35, 49, 50, 105/239, 247, 26 R, 37, 62 R, 342; 180/12, 89; 296/28 C, 35 A, 35

[56] References Cited

UNITED STATES PATENTS

| | | | |
|---|---|---|---|
| 2,070,895 | 2/1937 | Gray | 105/49 |
| 2,088,484 | 7/1937 | Schoepf et al | 105/62 R |
| 2,586,109 | 2/1952 | Steins | 105/37 |
| 3,352,254 | 11/1967 | Lauber | 105/4 R |
| 2,342,724 | 2/1944 | Candee | 105/35 X |
| 1,535,175 | 4/1925 | Mancha | 105/50 |
| 424,062 | 3/1890 | Hazard | 105/4 R |
| 553,756 | 1/1896 | Langen | 105/3 |
| 1,630,930 | 5/1927 | Fellers | 105/35 |
| 1,692,873 | 11/1928 | Sloane | 105/50 |
| 1,740,358 | 12/1929 | Latchau | 105/4 R |
| 1,855,642 | 4/1932 | Masury | 180/12 |
| 2,480,047 | 8/1949 | Reinhard | 180/89 X |
| 2,669,314 | 2/1954 | Quayle | 180/12 |
| 2,839,010 | 6/1958 | Harbulak | 105/1 R |
| 2,844,107 | 7/1958 | Miers et al | 105/3 |
| 2,925,135 | 2/1960 | Hamilton | 180/12 |
| 3,391,811 | 7/1968 | Barnes | 180/89 X |

Primary Examiner—Gerald M. Forlenza
Assistant Examiner—Howard Beltran
Attorney—Hilmond O. Vogel and Richard J. Myers

[57] ABSTRACT

A dispersed power train arrangement comprising a series of interconnected pairs of railroad cars, each pair being articulatedly connected with another pair by a power unit mounted on trucks between each pair of cars to define a freight unit, the free end of one car removably receiving a control cab unit or pod which is cushion mounted on one end of the car to absorb vibrational shocks, the pod having its structural collision member resiliently or spring suspending a cab containing the operator controls and seat, the controls being couplable with each of the power units of each of a series of pairs of cars defining the power train whereby an operator located in the cab may operate each power unit to drive the cars or may brake the cars. Alternately the dispersed power train arrangement comprises a pair of flat deck railway cars articulatedly connected with one another through the power unit or module mounted on trucks, the front end of the front car having a control pod mounted thereon with successive containers mounted on the flat deck by the control pod or the control pod may be replaced by a container and actually be located on top of the power unit or module. In all of the dispersed power train arrangements, one end of a car is supported by its own trucks and the other end is supported by the trucks of the power unit or module trucks.

27 Claims, 21 Drawing Figures

Patented July 25, 1972

INVENTOR
JACK E. GUTRIDGE
BY Richard J. Myers
ATT'Y

Patented July 25, 1972

INVENTOR
JACK E. GUTRIDGE
BY Richard J. Myers
ATT'Y.

Patented July 25, 1972

INVENTOR
JACK E. GUTRIDGE
BY Richard J. Myers
ATT'Y.

ARTICULATED MOTORIZED TRUCK TRAIN

CROSS REFERENCES TO RELATED APPLICATIONS

This patent application is a continuation-in-part application of my co-pending patent application, U.S. Ser. No. 712,167 filed Mar. 11, 1968, now abandoned.

BACKGROUND OF THE INVENTION

1. Field of Invention

This invention pertains to the field of railroad train art and, in particular, relates to the coupling of cars together with locomotive means for controlling the movement of the train.

The invention is also concerned more generally with means for coupling of the power means and power control means to a plurality of cars where the control means may be removed from the cars which carry the necessary power means for moving of the cars.

2. Description of the Prior Art

The prior art, as for instance on tandem vehicle arrangements, teaches the use of coupling a ground supported cab to a trailing lading carrying vehicle but it does not show a removable power control and passenger carrying pod for controlling a power unit carried between a pair of coupled together cars and providing for an ease of transference of the removable pod to different sets of cars or to another train. The applicant's invention solves such problems providing for a cushioned operator control cab or pod with sufficient power to actuate train line controls. Further, the power train arrangement solves the problem of dispersal of power along various places on the train rather than at the end or ends of the train.

SUMMARY

The invention provides for at least a pair of cars or vehicles each of which is adapted to carry passengers or freight and wherein between each car is provided a power source articulatingly connected to each vehicle, and a removable cab or passenger and train control carrying pod having control means operatively connecting with the power source for operation thereof and with the vehicle brakes for control thereof. The arrangement results in dispersal of power along the length of the train rather than at one end or the other or both ends of the train. The cab pod, being removable from its pair of vehicles, is mounted to the free end of one vehicle and suspendingly carries the operator and control portion. In one embodiment shown, the skirt portion of the pod unit is attached to the bumper which resiliently suspends the operator cab portion and isolates it from car vibrations. In another embodiment the skirt is connected to the cab portion both of which are sprung suspended from the bumper or structural collision member which is removably attached to the car body via elastomeric means to absorb car vibration. The cab portion being a sprung suspension provides the operator with a smooth ride. Additional units comprising a pair of cars and a power unit between each pair of the cars may be coupled to the pair of cars and power unit carrying the cab and control pod or compartment. Such an arrangement eliminates the use of a railroad train locomotive which is substantially heavier (like one-third the weight of a train) than the plurality of power means needed to pull an equivalent number of cars. The weight of the load of the pair of car units including power means is used for the tractive effort and saves the weight of the locomotive. Another form of the invention is to provide for a pair of flat deck railroad cars having a power unit or module articulatedly interconnecting each flat deck car wherein the control pod may be mounted at the forward end of the forward flat deck car much as a container is mounted on the flat deck car and then a plurality of containers are longitudinally aligned on the forward flat deck car. Further, the invention provides for a control pod which is mounted on the articulated power unit or module between the container bearing flat deck cars. The invention also comprehends ladder or stair means for passing over the power unit or module between two cars and further provides for support leg means to support the end of the car normally pivotally connected to one end of the power unit when the power unit is disconnected from the end of the car. The control pod arrangement also may include a train coupler for the electrical and pneumatic hook ups for the train. A hand brake arrangement may also be located at the power unit rather than at the end of a car. These and other objects and advantages will become apparent from reference to the following description and drawings.

DESCRIPTION OF THE PREFERRED EMBODIMENTS

Figures 1, 6, 7:
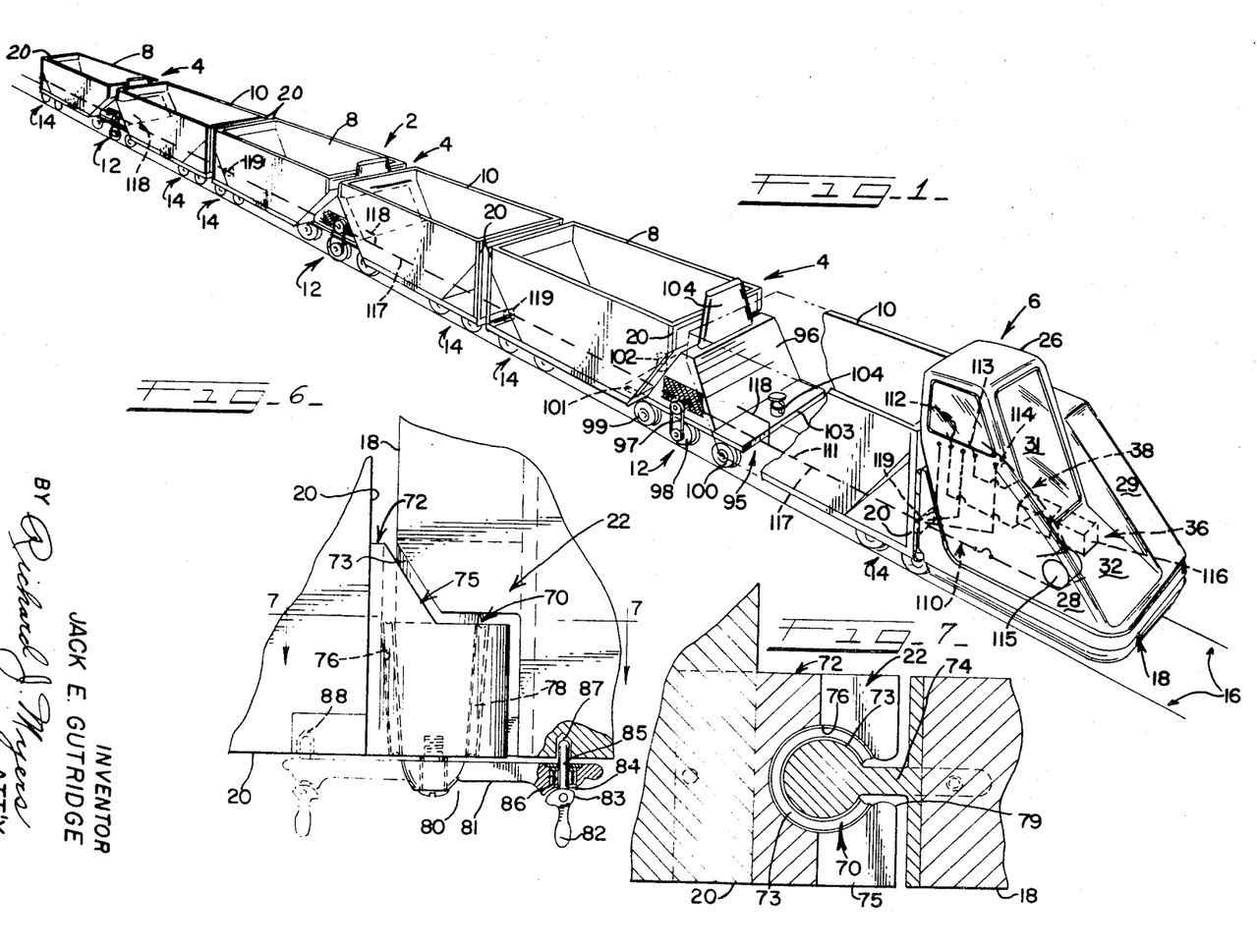
FIG. 1 is a perspective view of a power train arrangement embodying the principles of my invention.
FIG. 6 is an enlarged partial view illustrating the means for connecting of the pod means to the free end of the vehicle.
FIG. 7 is a sectional view taken along line 7—7 of FIG. 6.

With reference now to the drawings and in particular with reference to FIG. 1, there is shown a power train 2 comprising a plurality of load carrying or freight carrying powered or freight units 4, the forwardmost one of which carries a control pod or compartment 6. Each freight unit 4 comprises two individual cars or vehicles 8 and 10 having between them a power unit or means 12 for driving each unit 4 independent of every other unit. Each unit 4 of two cars 8 and 10 is coupled to another unit 4 so that the train 2 can consist of as many double car units 4 of cars 8 and 10 and power unit 12 as required. Each power unit 12 has sufficient power for not only moving its own weight in locomotion but also the weight of each of the cars 8 and 10 and the material or lading or freight within each of the cars 8 or 10 and thus a locomotive which is usually about a third of the weight of a train is eliminated. This is a substantial saving in weight as a power unit 12 may weigh on the order of 5,000 pounds but a locomotive can weigh, say, on the order of 250,000 pounds or 50 times as much as the power unit 12 which means that 50 power units 12 could pull 100 hopper cars 8 and 10, as shown, filled with material to be transported. The head of the train 2 of plurality of two car units 4 carries the control pod or compartment 6 which not only houses the operator but also houses the controls for operating the brakes on the units or sets 4 of cars 8 and 10 and for operating the power units 12 between each car 8 and 10 of a set or unit 4 of cars 8 and 10. Each hopper car 8 or 10 is provided with truck means 14 which comprises the usual wheels at one end of the car for engagement with the rail means 16 a, the other end of each car 8 or 10 being coupled to the truck supported power unit 12 which is articulatedly connected to each car 8 and 10.

The control pod or compartment 6, which is seen in FIGS. 1-5, comprises an operator and control part or unit 16 carried in spring suspension on a structural collision member or part or unit 18 which is removably attached to the end 20 of a car unit 8 or 10 by resilient or limited energy absorbing connector or lock means 22. The operator unit or cab 16 comprises an operator and control containing body 26 having a top 27 and side 28 and side storage portion 29 which extends in outwardly downwardly sloping fashion to provide an open area 30 between it and the side wall 28 to permit the operator to have a clear view outwardly of the front full length window 31 extending from the forward lower diagonally extending front portion 32 to the window 31 between the side 28 and the storage compartment 29. The operator sits within the compartment upon a seat 34 such that he has a clear line of vision from his side windows 31a and front window 31 outwardly to the lower forward end of the pod as well as directly outwardly of his line of vision as shown by dotted lines in FIG. 3. The controls 36 are stored within the compartment 26 within easy reach of the operator as he locates himself in one of two seats 34, the controls 36 including the necessary storage battery 37 and electrical components or controls 38 necessary to operate the vehicle brakes and the power unit 12.

Figure 2:
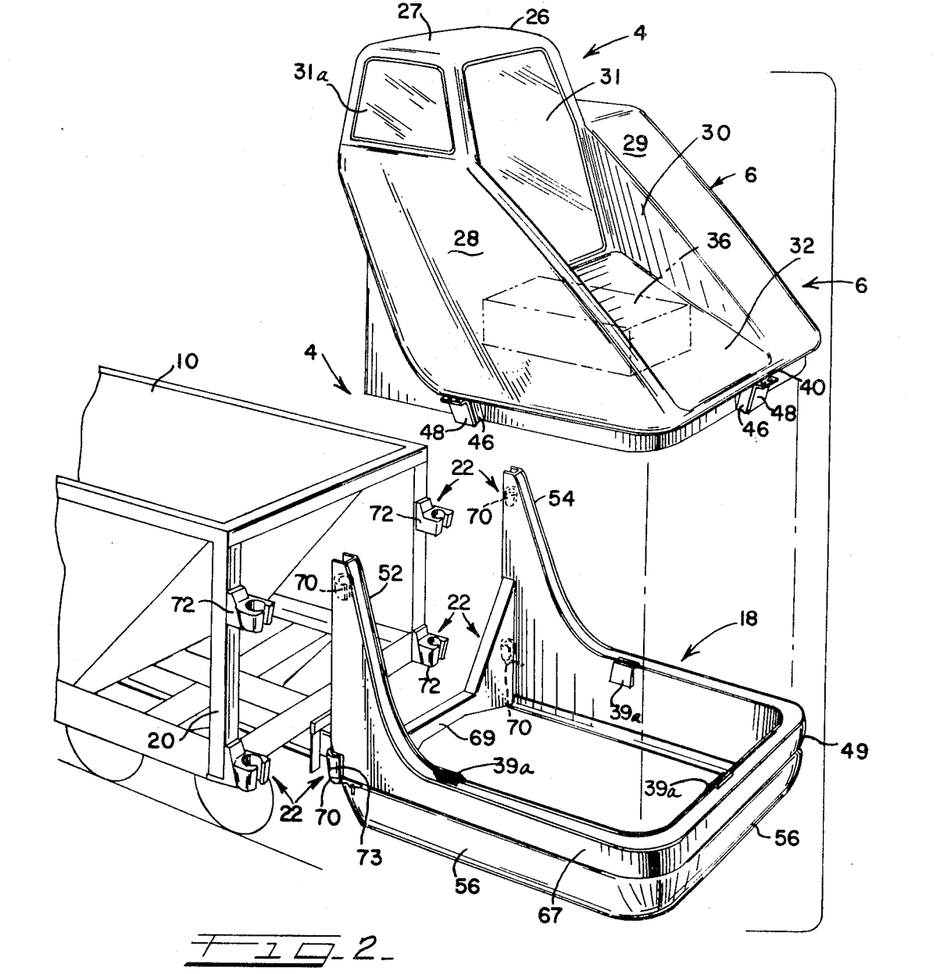
FIG. 2 is a perspective exploded view illustrating the relationship between the operator and control cab and the structural collision member of the pod or compartment means in relation to the free end of one of the cars to which the pod is to be coupled.
Figures 3, 5:
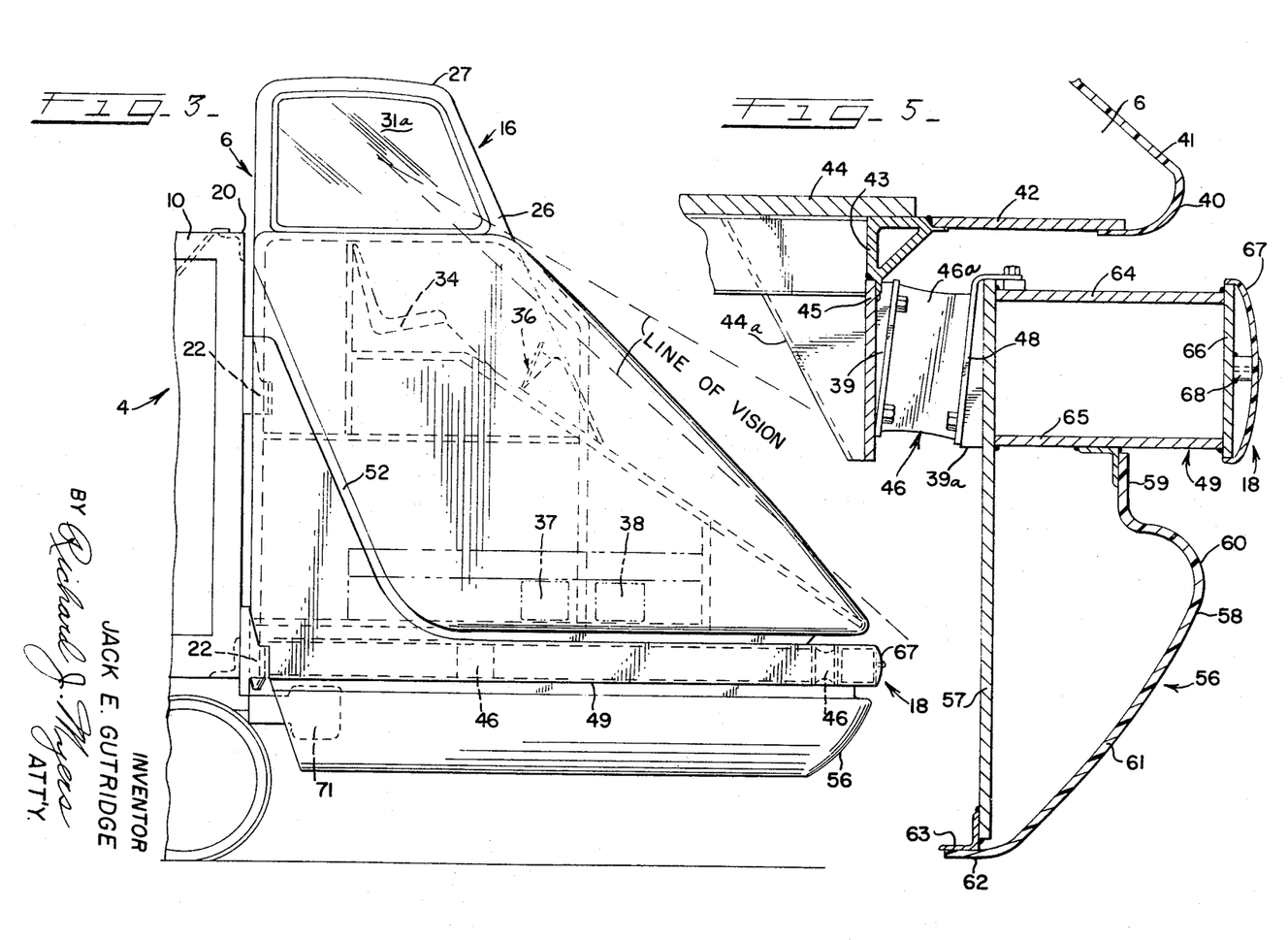
FIG. 3 is a sectional view in side elevation of the assembled pod connected with the free end of one of the vehicles.
FIG. 5 is a sectional view taken along 5—5 of FIG. 4.
Figure 4:
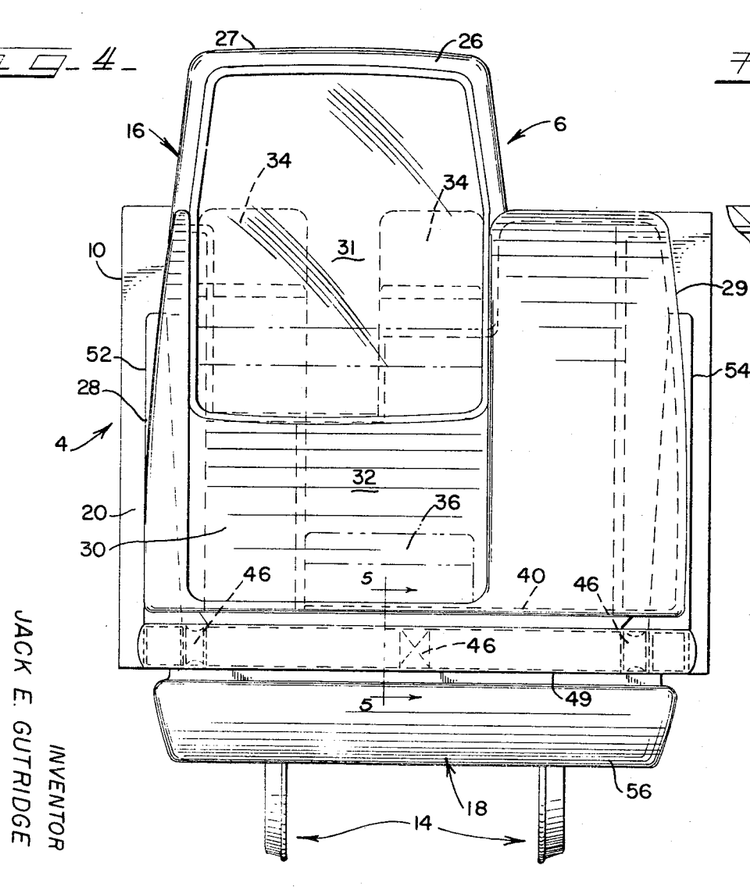
FIG. 4 is a front view of the assembled pod and the end of the vehicle to which it is attached.

The lower outer peripheral portions of the cab body are provided with side and front cushion or resilient units 46 below the forward lower end portion 40 of the cab body 26, as seen in FIG. 2. The lower end portion of the cab body includes not only the forward plastic hollow toe portion 41 but horizontal steel plate 42 welded to triangular plate section 43 attached under floor plate 44 of the cab compartment 16 as seen in FIG. 5. The triangular plate structure 43 has depended from it the upright structural plate 45, to which is attached the V-blocks 39 of the cushion units 46. Reinforcing plate means 44a connect floor plate 44 with U-shaped plate 45. A rubber cushion or other elastomeric type of member 46a of each unit 46 is attached to each of the three V-blocks 39. The members 46a are attached at their outer portions to L-shaped clamps 48 which are removably bolted to V-shaped block 39a and plate 64 of bumper structure 49 of structural collision member 18. The member 18 also includes upright collision right and left downwardly forwardly sloping frame portions 52 and 54, as well as depending U-shaped skirt portion 56 attached to the underside of the wrap around bumper structure 49. The skirt structure 56 comprises a downwardly extending U-shaped steel plate 57 that extends around the front and sides of the operator control structure 16 and the forwardly disposed outer skirt portion 58 which similarly extends about the front and sides of the structure 16 and comprises an upper straight portion 59 and an intermediate outwardly bowed or bulbous portion 60 and a lower and downwardly backwardly sloping portion 61 and an underside straight portion 62 held by wrap around angle plate means 63 to the upright wrap around member 57. The bumper structure 49 formed in part by the upright member 57 is also provided with upper and lower wrap around parallel plate structures 64 and 65 and forward vertical wrap around plate 66 to which is attached upright cover 67 which is bowed and separated from plate 66 by spacer 68. The cover extends along the front and sides of the passenger pod portion 16 also in wrap around fashion.

The skirt and bumper structural collision member or unit 18 is provided with a lower rearward transverse member 69 which connects with each of the upstanding right and left rearward arms 52, 54 (see FIG. 2). Each rearward arm 52 and 54 is triangularly shaped with its apex terminating upwardly and these arms 52 and 54 embrace the sides of pod portion 16 which is received in part 18 with engagement and coupling of the rubber cushion units 46 with the bumper part 49 of the structural collision member 18, as seen in exploded view FIG. 2 and assembled views FIGS. 3 and 4.

The upper and lower portions of the rear upward arms 52 and 54 of the structural collision member 18 are provided with the coupling or locking members or units 70, there being four such units in all, of the attaching or locking structure 22 which couple with complementary coupling units 72, there also being four of such units, which are attached to the end frame structure of either end 20 of the hopper unit 10 or 8 of the train unit 4. A car coupler 71 extends from each end 20 of a car 8 or 10 (see FIG. 3). The pod mounted coupling means 70 comprises a generally conical shaped body 73 which is circular in cross section and is attached in recessed portions of the rear upper and lower portions 52 and 54 by arms 74, as seen in FIGS. 6 and 7. The outer peripheral portion of the conical bodies or plugs 73 in the car coupling position register with the coupler means 72 on the end 20 of the car 10 or 8. Each coupler unit 72 comprises a projecting body 75 which is mounted at the upper and lower portions of the end of the car and each body 75 has a conical shaped plug receptacle or opening 76 therein which is circular in cross section and is lined with an elastomeric or rubber-like tube 78 for the reception of the plug 73 such that the plug 73 engages the inside periphery of the tubular member 78 and passes through it to extend below. The body 75 and the elastomeric tubular insert 78 is tapered to receive the tapered end of plug portion 73 and the body 75 is provided with a slot 79 for vertical movement of the arm 74 to allow coupling between the members 70 and 72, as seen in FIGS. 6 and 7. The lower end of each of only the lower pair of plugs 73 pivotally carries lock member 80 which includes pivotal arm 81 having catch 82 at its free end. The catch 82 comprises a downwardly depending pivotal arm 83 bearing against outer lower curved or cammed portion 84 of the arm 81. The depending catch arm 83 pivotally carries upwardly projecting catch pin 85 extending through opening 86 in the outer end of arm 81 and into bore 87 in the lower rear end of the structural collision member 18 for storing, or in the opening or aperture 88 in the lower forward or upper forward end 20 for locking, as seen in dotted line position in FIG. 6 to permit alternate coupling of the swivel lock 80 between the pod 6 and the end 20 of one of the cars 8 or 10 to limit or prevent upward movement of the pod 6 with respect to the car body 8 or 10 which carries the pod. The pod arrangement 6 and two cars 8 and 10 may be so constructed so that the pod 6 may be attached to only one end of one of the two car unit 4 (including power unit 12) while the other end of the other of two cars 8 and 10 is adapted to receive another two car unit 4.

Figure 8:
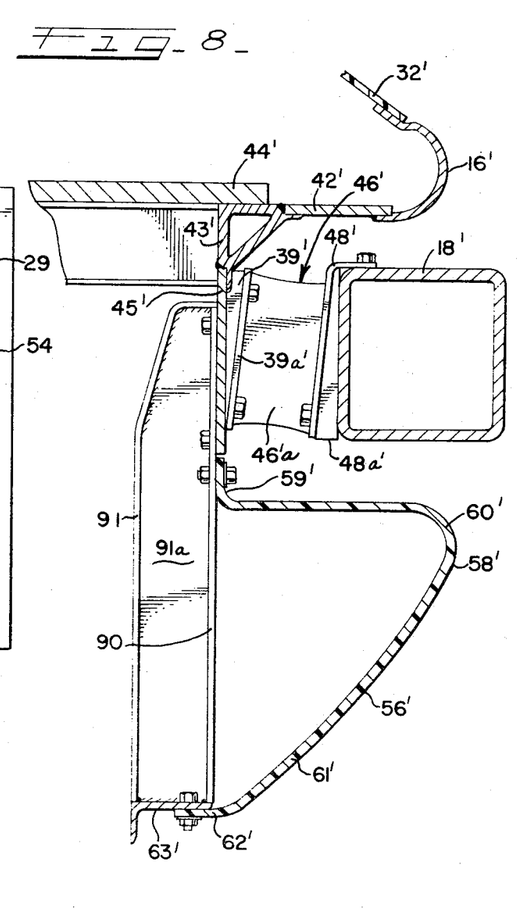
FIG. 8 is a view similar to FIG. 5 but showing a modified form of connection between the pod operator and control part, and pod bumper and pod skirt.

FIG. 8 is illustrative of a modified form of cab and structural reinforcing member arrangement wherein the cab unit 16' has a plastic cover 32', a horizontal plate 42' and a floor plate 44', and a reinforcing triangular plate structure 43' and downwardly depending plate 45' which carries the V-shaped steel block 39', plate 39a', L-shaped plate 48' and the rubber or elastomeric cushion 46'a of the cushion unit 46' for connection of the cab 16' to the structural collision member or unit 18' which is essentially tubular and square in cross section as distinguished from the embodiment shown in FIG. 5. The plate 48' attached to the rubber element 46'a is releasably bolted to block 48a' and member 18' as in the case of the embodiment shown in FIG. 5. The skirt 56', having its portions 61', 62', 58', 59' and 60', is attached to a depending arm or plate 90 attached by bolt means to the depending member 45' and is provided with attachment bracket reinforcing web 91a and plate 91 held by lower wrap around angle plate 63'. Under this arrangement, the bumper 56' is attached by bolt means to the depending structure 91, 90 which is attached to the underside of the cab 16' by depending plate 45'. Therefore, the bumper is not attached to the structural collision member 18' directly but is attached to the cab portion 16' directly so that the bumper is also resiliently suspended or spring suspended from the structural collision member 18' where first embodiment provides that the skirt is attached to the structural collision member and is not sprung suspended.

With reference now to FIG. 1, it is seen that the power unit 12 is comprised of truck or dolly arrangement 95 coupling each of two cars 8 and 10 together. The arrangement 95 comprises a power or drive unit 96 provided with drive or chain means 97 for driving rail engaging wheel 98 and fore and aft rail engaging wheels 99 and 100, all of which suspend the articulated platform or plate structure 101 which has its rear end 102 pivotally connected to the one car 8 and has its forward end 103 pivotally connected at 104 to the forward car 10. The motor or turboengine type unit 96 is provided with an exhaust stack 104 which allows the exhaust gases to exit. It will be appreciated that the source of power 96 may be an electric motor or a turbine driven engine or a diesel or gas engine or any other type of power means.

FIG. 1 also shows the connection between the power control structure 36 underneath the driver's seat 34 and the hopper cars 8 and 10 and the power carrying truck or unit 12. The power connection means of the control means 36 is designated by numeral 110 and comprises an electrical circuitry 111 which is provided with brake switch means 112 for operation of the brakes to brake the vehicle for stopping or slowing down, electrical speed control means 113 for controlling the speed of the train as determined by the turbo power units 12, stop and start power switch means 114 for controlling the turbo power units 12, a generator 115 for the circuit 111 and a battery 116 for supplying power to the circuit 111. The circuit 111 is provided with electrical lead means 117 extending to each of the power units 96 by means of electrical connection 118 and connection is made between the electrical connections 117 for each unit by means of disconnectable plug arrangements 119. The electric connection means 117 also supplies the necessary electrical current for operation of the glow plug means of the gas turbine engine. It will be appreciated that the electrical means 110 may also operate, instead of a gas turbine unit, an electrical motor or diesel engine or the like for the operation thereof.

Figures 9, 16:
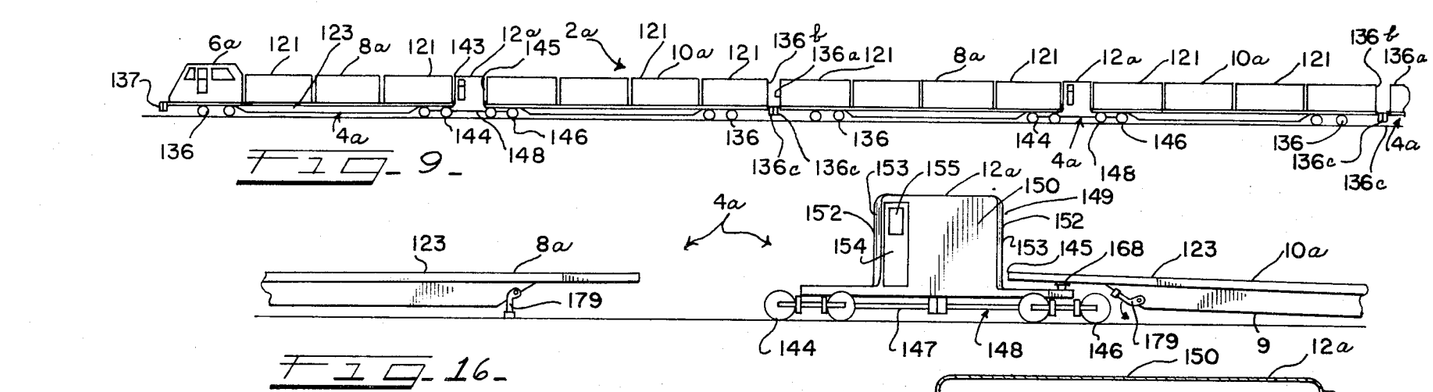
FIG. 9 is a side elevational view of a modified form of the dispersed power train.
FIG. 16 is an elevational view showing in process the separation of the power unit from the respective cars.
Figure 10:
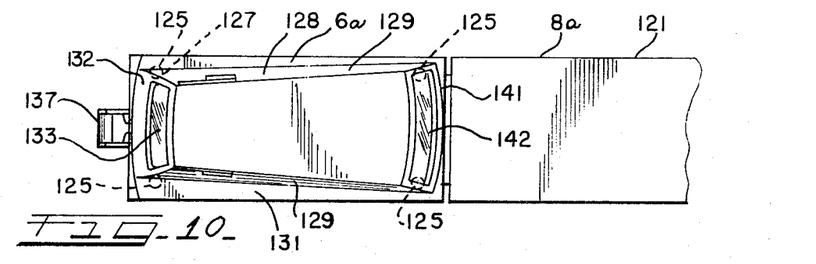
FIG. 10 is a top plan view of the front portion of the power train including the control pod shown in FIG. 9.
Figure 11:
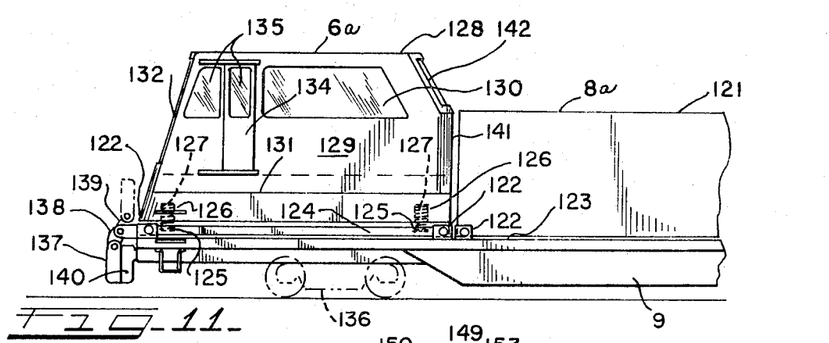
FIG. 11 is a side elevational view of the front portion of the power train shown in FIG. 10.

With reference now to the modified form shown in FIGS. 9–17, there is shown a plurality of car or freight units 4a in the train 2a. Each freight unit 4a comprises a pair of fore and aft cars or vehicles 8a and 10a and a power unit or means 12a articulatedly connecting the cars 8a and 10a. Each car 8a or 10a is a flat deck railroad car and supports thereon on its underframe 9 a plurality of four containers 121 with the exception of the train's leading car 8a which has at its forward end 120, in place of a container 121, the control pod 6a. Each container 121 and the control pod 6a are provided with conventional corner castings 122 which couple with conventional tie down means on the deck 123 of the railroad cars 8a or 10a (see FIG. 11). The four corner castings 122 of the control pod are mounted in the control pod base 124 which is provided with four spring pockets 125 at each of its corners for supporting compression springs 126 which are received in the pockets 127 in the upper control pod body 128 for providing a sprung suspension relation and flexible connection between the pod body 128 and the pod base 124 to give the operator a smooth ride. The pod body 128 is best seen in FIGS. 10 and 11 and includes sides 129, side windows 130, a stepping platform 131 (to aid entrance of the operator into the control pod), forwardly and downwardly sloping front wall 132, front window 133 and operator inlet door 134 and windows 135. The pod is of streamlined construction and is supported on forward or outer trucks 136 at the forward outer end of leading freight unit 4a and includes a forward connector box 137 which is pivotally connected by link 138 to the forward pod link 139 on the forward end of the base platform 124 of the control pod 6a. The electrical connection box 137, which includes the electrical connection means between the pod or cab 6a and the power unit 12a, is shown in FIG. 11 in the raised uncoupled and out-of-use position (in dotted line) and in the coupled in-use position (solid line) coupled with the transit coupler 140 which includes the electrical wires that extend rearwardly and join with the power unit 12a. The electrical connection arrangement permits an operator within the control pod 6a to turn on operation of the power unit 12a from the operator position in the control pod 6a. The operator control pod is also provided with a rear wall 141 having a rear window 142. The adjacent coupled ends 136a and 136b of cars 8a and 10a respectively are fixedly coupled to one another by couplers 136c and are each supported by a truck 136 (see FIG. 9).

Figure 12:
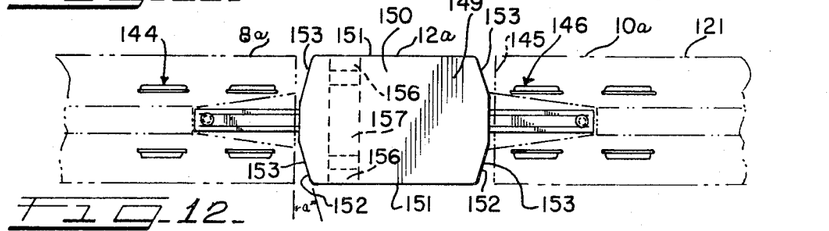
FIG. 12 is a partial plan view of the center portion of the modified power train showing the power unit or module on the truck articulatedly connecting with the train cars.
Figure 13:
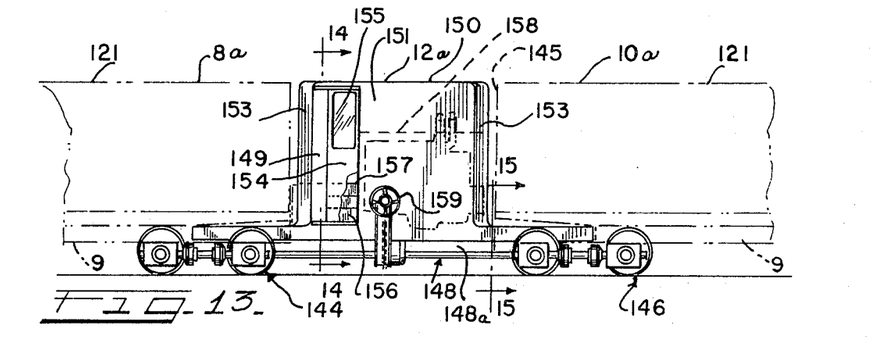
FIG. 13 is a side elevational view of that shown in FIG. 12.
Figure 14:
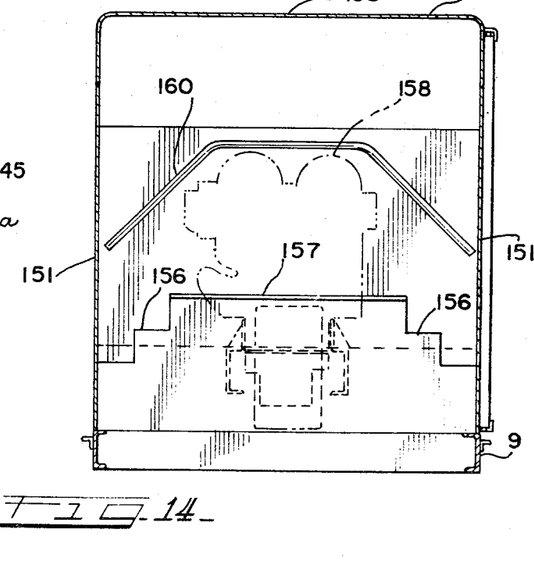
FIG. 14 is a sectional view taken along line 14—14 of FIG. 13.

As best seen in FIGS. 12 and 13, the inner or rear end 143 of the forward car 8a does not have any trucks like trucks 136 at its forward end but is supported by the trucks 144 of the power unit 12a, and the outer or forward end 145 of the trailing car 10a does not have its own trucks but is also supported by the trucks 146 of the power unit 12a. The trucks 144 and 146 are connected with one another through a common drive shaft 147 and form part of the truck structure 148 including main truck frame 148a which carries the power unit body 149 and with it comprises the power unit 12a. The power unit body 149 has a roof 150 and sides 151 and ends 152 which at their lateral outer portions 153 are tapered to permit pivotal movement of cars 8a and 10a with respect to the power unit 12a as shown in FIGS. 12 and 13. Thus, as seen in FIG. 12, an angle "a" of swing clearance is provided between the power unit body lateral end portions 153 and the adjacent car 8a or 10a. Each side 151 is provided with a door 154 having a window 155 and stairs 156 are provided on each side at each door and rise to a platform 157 giving the operator access to the interiorly located motor or power supply unit 158 such as a diesel or gas turbine engine (FIGS. 12–14). A hand brake arrangement 159 is mounted on the outside of the power unit 12a for operating brake means on the trucks 144 and 146. A hand rail 160 is provided inside the car for the operator when walking up the stairs 156 and on the platform 157.

Figure 15:
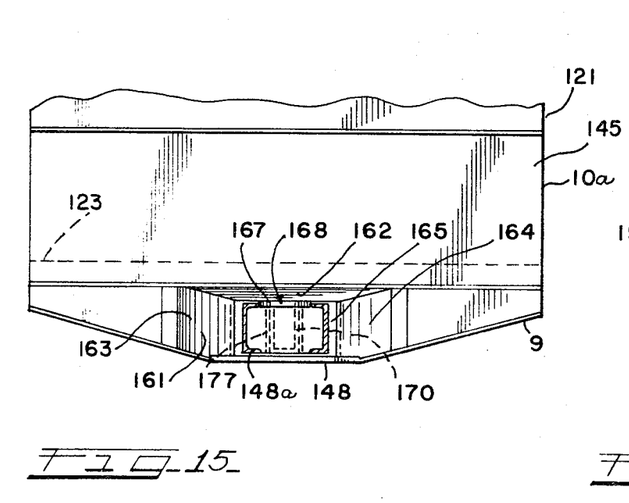
FIG. 15 is a sectional view taken along line 15—15 of FIG. 13.
Figure 17:
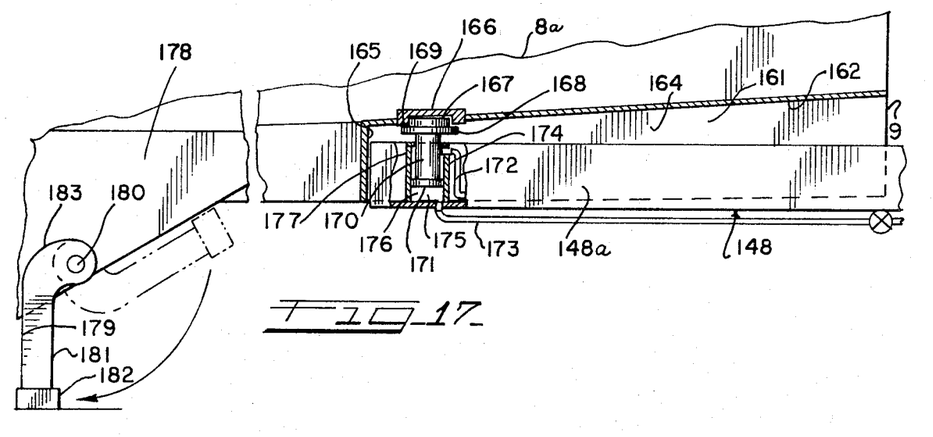
FIG. 17 is a partial side elevational view showing the connection between the end of one car and one end of the power unit.

As seen in FIGS. 15 and 17, the main truck frame 148a of the truck structure 148 is receivable within the slotted under portion or apertured portion in the lower end portion of the underframe 9 of either car 8a or car 10a. The slotted under portion 161 is provided with an upwardly outwardly sloping top wall 162 to provide for a wider vertical opening to aid entrance of the truck structure 148 therein. The enlarged apertured portion or socket portion 161 has an open bottom and an open end and is also provided with outwardly diverging side walls 163 and 164 and an inner end wall 165. The inner part of the top wall 162 is provided with a U-shaped socket 166 for receiving the outer end portion 167 of a center plate jack structure 168 of truck structure 148 which jack structure has a flange 169 engaging with the sides of the socket 166 and the structure 168 also has a shank portion 170 that acts as a piston and is provided with a lower end piston head 171. Air lines 172 and 173 respectively fill or drain air with respect to passages 174 and 175 respectively for selectively raising and lowering the jack assembly 168 pneumatically attendant to engagement and disengagement of the assembly 168 with the socket 166 for coupling the power unit and cars together. The passages 174 and 175 are defined by the piston head 171 which is reciprocal in the chamber 176 of the cylinder or housing 177 in the end of the main truck frame 148a. The fishbelly portion 178 of the underframe 9 pivotally carries stand or support leg means 179 pivotally connected thereto by pivot 180. The support leg means support the end of the car to be coupled by the power unit when the power unit is removed therefrom so that that end of the car can be self-supporting.

The stand 179 has a leg 181 which has a base 182 and also has a curved neck portion 183 which allows the stand 179 to be swung down from an upper dotted line position to a lower downward depending support position as shown in FIG. 17. FIG. 16 schematically depicts the coupling and uncoupling of a car 8a or 10a to the power unit 12a and in particular shows that the car 8a is spaced from the power unit 12a in a disconnected manner and is supported by stand 179. The car 10a has its end supported on the jack assembly 168 of the power unit 12a and the support stand 179 of car 10a is in the raised out of use position.

Figure 18:
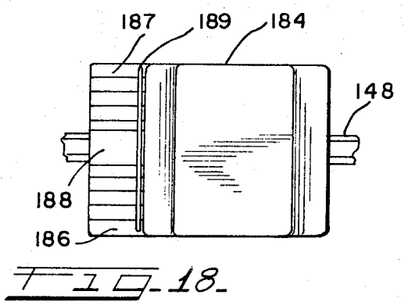
FIG. 18 is a plan view of another modified form of the power unit.
Figure 19:
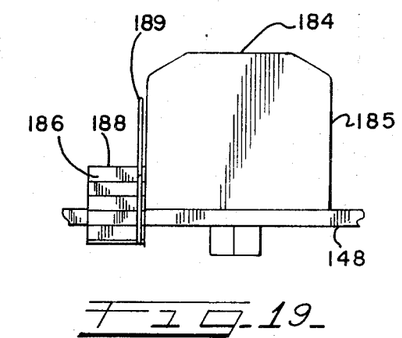
FIG. 19 is a side elevation of the power unit shown in FIG. 18.
Figure 20:
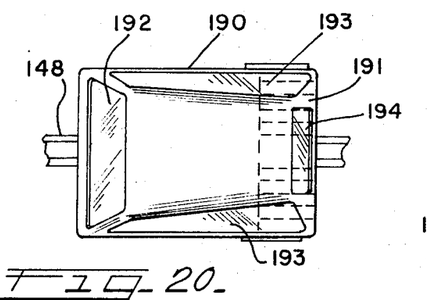
FIG. 20 is a plan view of a still further modified form of the power unit including a control pod.
Figure 21:
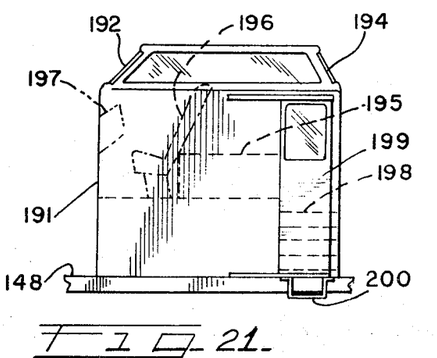
FIG. 21 is a side elevational view of the combination power unit and control pod shown in FIG. 20.

A modified form of a power unit 184 is shown in FIGS. 18 and 19 and differs from the power unit 12a in that although it has a housing 185 for covering the power supply means, the cross-over steps 186, 187 and platform 188 and hand rail 189 are uncovered. The further modification shown in FIG. 20 includes a power unit 190 which is covered by a housing or cab body 191 including a front window 192, side windows 193, and a rear window 194. In addition to a housing 195 which stores the power supply means there is also provided an operator's seat 196 and a control box 197 whereby the operator may sit in the power unit 190 between two cars 8a and 10a and observe through the window 192 or 194 movement of the train before and behind him and also to operate the train. In the modified power unit 190 the stairs 198 are provided at the right end as distinguished from the left end where the stairs 186 are located. The cab body 191 is provided with a door 199 leading to the stairs and being spaced above the U-shaped foot rail 200.

Thus it is seen that the control pod may be located at the front end of the front car or on the power module or power unit 12a. The power module 12a also may be enclosed or may be open. A series of freight units, each of which include two railroad cars and an interconnected power unit, make up a train whereby the power, as well as the weight of the power unit, to operate and run the train can be dispersed throughout the train so that a more even or spread out tractive power is given to the train.

The foregoing description and drawings are given merely to explain and illustrate the invention, and the invention is not to be limited thereto, except insofar as the appended claims are so limited, since those skilled in the art who have the disclosure before them will be able to make modifications and variations therein without departing from the scope of the invention.

What is claimed is:

1. A power train comprising:
   a pair of cars mounted on top of and carried upon the ground,
   a ground carried mobile power unit for supplying locomotion to each of the cars being between and pivotally connecting with each of the cars,
   an operator control unit releasably mounted on the free end of one of the cars and operatively connected with the power unit for supplying motive force to each of the cars and operatively connected with each of the cars for controlling the speed of said cars when in motion,
   said control unit comprising a bumper mounted on the free end of one of the cars and an operator control cab part carried on the bumper.

2. A power train comprising:
   a pair of cars mounted on top of and carried upon the ground,
   a ground carried mobile power unit for supplying locomotion to each of the cars being between and pivotally connecting with each of the cars,
   an operator control unit releasably mounted on the free end of one of the cars and operatively connected with the power unit for supplying motive force to each of the cars and operatively connected with each of the cars for controlling the speed of said cars when in motion, said control unit comprising a bumper mounted on the free end of one of the cars and an operator control cab part carried on the bumper,
   a car demountable structural collision member,
   a removable operator control cab part,
   said cab part having means for locking the cab part to the collision member,
   said means including resilient means connecting said collision member with said cab part providing a sprung suspension of said cab part on said structural collision member, and
   coupling means on said free end of the car and on said structural collision member for coupling the collision member to the free end of the car.

3. The invention according to claim 2, and said coupling means comprising:
   said collision member having rear upright portions,
   plug elements on the rear of the upright portions of the collision member, and
   said free end of the car having receptacle means for receiving said plug elements.

4. The invention according to claim 3, and
   said plug elements having catch means for locking the plug elements to the receptacle means and preventing vertical movement out of the receptacle means.

5. The invention according to claim 3, and
   said plug elements being downwardly tapered cone bodies.

6. The invention according to claim 3, and
   said plug elements being at upper and lower parts of the upright portions.

7. The invention according to claim 3, and
   said receptacle means being provided with resilient material for absorbing vibrational shock.

8. The invention according to claim 2, and
   said collision member being provided with a horizontally extending wrap around bumper portion and rearwardly upwardly extending side portions carrying the coupling means in the form of plug elements.

9. The invention according to claim 8, and
   said structural collision member having a wrap around skirt member depending from the wrap around bumper portion.

10. The invention according to claim 2, and
    said structural collision member comprising a generally U-shaped member having a central opening for receiving said cab part and having upwardly extending rearward walls and lower horizontally extending side and front walls defining bumper means.

11. The invention according to claim 10, and
    said skirt means depending from said cab part for resiliently suspending said skirt means.

12. The invention according to claim 2, and
    said coupling means being adapted to provide a cushioned coupling with the end of the car.

13. The invention according to claim 12, and
    said plug members being adapted to provide a cushioned coupling with the end of the car.

14. An operator control cab arrangement for removably coupling on one end of a car, comprising:
    a structural collision member having a lower forwardly extending bumper having front and side wrap around portions,
    a pair of laterally spaced rearward side walls extending upwardly above said side portions of the bumper and attached to the rear end of each side portion and having coupling means for coupling with the end of the car,
    an operator and control cab in the form of a compartment mounted on and between said side portions, said rear portions and said front portions of the structural collision member, and
    resilient means on the side and front portions resiliently and spring suspending the cab with respect to the structural member, said cab having an operator seat and a control panel for operating a power unit to provide locomotion for said car.

15. The invention according to claim 14, and said structural reinforcing member having a wrap around skirt structure depending from the structural member and generally continuous with the front and side portions of said structural member and extending therebelow.

16. The invention according to claim 14, and
said cab being receivable within the opening in said structural member which resiliently suspends it.

17. The invention according to claim 14, and
a skirt means depending from said cab and extending around the outer periphery of said cab.

18. The invention according to claim 14, and
said compartment forming an enclosure for the operator and his controls.

19. The invention according to claim 14, and
the other end of said car being adapted to receive a power unit,
said power unit being pivotally connected thereto and being operatively connected with said operator cab and controlled by said cab for providing locomotion for the cab and car, and
said cab having control means for braking the speed of said car.

20. The invention according to claim 14, and
said rear walls and said side walls and front walls of the structural collision member being generally U-shaped and defining a cab receiving opening.

21. The invention according to claim 14, and
said collision member coupling means including upper and lower lateral spaced apart pairs of plug members receivable in associated receptacles on the end of the car.

22. A powered train comprising:
at least a pair of cars,
a vehicular power unit including a power source for supplying locomotion to each of the cars and being between and pivotally connecting with each of the cars,
an operator control unit separably mounted on the train and operatively connected with the power unit for supplying motive force to each of the cars,
each car having a free end part and a power unit coupling end part,
each car having car trucks connecting with the free end part of the respective car and rollingly supporting the free end part of the car,
said power unit supported on truck means for rollingly supporting the coupling end part
said truck means having a first couple means coupling one end of said truck means with the power unit coupling end part of one car and rollingly supporting same and having a second couple means coupling the other end of said power unit with the power unit coupling end part of the other car and rollingly supporting same, and
said operator control unit including a control pod being releasably mounted on the free end part of one of the cars wherein said free end part has hooking means and said pod has other hooking means to interconnect the pod and the free end part of the car to support the control pod entirely on the free end part.

23. A powered train comprising:
at least a pair of cars,
a vehicular power unit including a power source for supplying locomotion to each of the cars and being between and pivotally connecting with each of the cars,
an operator control unit separably mounted on the train and operatively connected with the power unit for supplying motive force to each of the cars,
each car having a free end part and a power unit coupling end part,
each car having car trucks connecting with the free end part of the respective car and rollingly supporting the free end part of the car,
said power unit supported on truck means for rollingly supporting the coupling end part,
said truck means having a first couple means coupling one end of said truck means with the power unit coupling end part of one car and rollingly supporting same and having a second couple means coupling the other end of said power unit with the power unit coupling end part of the other car and rollingly supporting same, and
one of said cars being at the front of the train, said one car having a platform and container means carried on said platform, said platform at the free end part of said one car having releasably mounted thereon the control unit in the form of a control pod.

24. The invention according to claim 23, and
said power unit including a handbrake for braking the speed of the train.

25. A powered train comprising:
at least a pair of cars,
a vehicular power unit including a power source for supplying locomotion to each of the cars and being between and pivotally connecting with each of the cars,
an operator control unit separably mounted on the train and operatively connected with the power unit for supplying motive force to each of the cars,
each car having a free end part and a power unit coupling end part,
each car having car trucks connecting with the free end part of the respective car and rollingly supporting the free end part of the car,
said power unit supported on truck means for rollingly supporting the coupling end part
said truck means having a first couple means coupling one end of said truck means with the power unit coupling end part of one car and rollingly supporting same and having a second couple means coupling the other end of said power unit with the power unit coupling end part of the other car and rollingly supporting same, and
one of said cars being a forward car of the train and said control unit being a control pod mounted on the front part of the forward car and resilient means being disposed between said control pod and the front part of the forward car providing for a resilient suspension of the control pod on the front part of the car.

26. A powered train comprising:
at least a pair of cars,
a vehicular power unit including a power source for supplying locomotion to each of the cars and being between and pivotally connecting with each of the cars,
an operator control unit separably mounted on the train and operatively connected with the power unit for supplying motive force to each of the cars,
each car having a free end part and a power unit coupling end part,
each car having car trucks connecting with the free end part of the respective car and rollingly supporting the free end part of the car,
said power unit supported on truck means for rollingly supporting the coupling end part,
truck means having a first couple means coupling one end of said truck means with the power unit coupling end part of one car and rollingly supporting same and having a second couple means coupling the other end of said power unit with the power unit coupling end part of the other car and rollingly supporting same, and
resilient means being provided between said control unit and the underframe of one of the cars to provide for a resilient suspension of the control unit.

27. A powered train comprising:
at least a pair of cars,
a vehicular power unit including a power source for supplying locomotion to each of the cars and being between and pivotally connecting with each of the cars,
an operator control unit separably mounted on the train and operatively connected with the power unit for supplying motive force to each of the cars, each car having a free end part and a power unit coupling end part, each car having car trucks connecting with the free end part of the respective car and rollingly supporting the free end part of the car, said power unit supported on truck means for rollingly supporting the coupling end part said truck means having a first couple means coupling one end of said truck means with the power unit coupling end part of one car and rollingly supporting same and having a second couple means coupling the other end of said power unit with the power unit coupling end part of the other car and rollingly supporting same, one of the cars being a forward car having an underframe portion and said control unit being mounted on the forward portion of the underframe portion, said car underframe portion in back of the control unit supporting container means thereon.

* * * * *